(12) United States Patent
Afzal

(10) Patent No.: US 9,984,142 B2
(45) Date of Patent: May 29, 2018

(54) SINGLE UNIT OF WORK

(71) Applicant: Oracle International Corporation, Redwood Shores, CA (US)

(72) Inventor: Mirza Naeem Afzal, Mountain House, CA (US)

(73) Assignee: Oracle International Corporation, Redwood Shores, CA (US)

( * ) Notice: Subject to any disclaimer, the term of this patent is extended or adjusted under 35 U.S.C. 154(b) by 411 days.

(21) Appl. No.: 14/934,061

(22) Filed: Nov. 5, 2015

(65) Prior Publication Data

US 2017/0132304 A1 May 11, 2017

(51) Int. Cl.
*G06F 17/30* (2006.01)
*G06F 3/0484* (2013.01)

(52) U.S. Cl.
CPC .... *G06F 17/30592* (2013.01); *G06F 3/04842* (2013.01); *G06F 3/04847* (2013.01); *G06F 17/30371* (2013.01)

(58) Field of Classification Search
CPC ................................................ G06F 17/30371
See application file for complete search history.

(56) References Cited

U.S. PATENT DOCUMENTS

| 5,313,629 | A | 5/1994 | Abraham |
| 5,706,500 | A | 1/1998 | Dzikewich |
| 5,903,881 | A | 5/1999 | Schrader |
| 5,953,719 | A | 9/1999 | Kleewein |
| 6,493,726 | B1 * | 12/2002 | Ganesh ............ G06F 17/30362 |
| 7,206,805 | B1 * | 4/2007 | McLaughlin, Jr. ..... G06F 9/466 707/999.01 |

(Continued)

OTHER PUBLICATIONS

Fragments; obtained at http://developer.android.com/guide/components/fragments.html; downloaded Nov. 5, 2015; 25 pages.

(Continued)

*Primary Examiner* — Kris E Mackes
(74) *Attorney, Agent, or Firm* — Tarolli, Sundheim, Covell & Tummino LLP

(57) ABSTRACT

A system and method for facilitating construction and operation of a compound transaction. An example method includes presenting a first User Interface (UI) mechanism enabling user selection of plural component transactions to be included in a first compound transaction; providing a second UI mechanism enabling user specification of atomicity of the first compound transaction; and displaying a third UI mechanism enabling user initiation of a first save operation for each specification of each component transaction of the plural component transactions of the first compound transaction; illustrating a fourth UI mechanism enabling user initiation of a second save operation for the entire first compound transaction; and in response to user initiation of the second save operation, ascertaining whether each component transaction has been saved; determining atomicity of the compound transaction; and implementing all or no database operations specified via the first compound transaction when the plural component transactions have been saved; when all component transactions have completed logic processing associated therewith; and when the compound transaction is indicated as atomic.

20 Claims, 8 Drawing Sheets

(56) References Cited

U.S. PATENT DOCUMENTS

| | | | |
|---|---|---|---|
| 7,290,056 B1* | 10/2007 | McLaughlin, Jr. | H04L 43/0852 |
| | | | 709/201 |
| 8,078,588 B2* | 12/2011 | Lakshminath | G06F 9/466 |
| | | | 707/675 |
| 8,255,813 B2 | 8/2012 | Yaseen | |
| 8,527,501 B2 | 9/2013 | Horii | |
| 8,606,833 B2 | 12/2013 | Hickson | |
| 2006/0190243 A1* | 8/2006 | Barkai | G06F 17/30486 |
| | | | 704/8 |
| 2006/0294333 A1* | 12/2006 | Michaylov | G06F 9/466 |
| | | | 711/168 |
| 2007/0245302 A1 | 10/2007 | Grotjohn | |
| 2009/0100421 A1 | 4/2009 | Fleming | |
| 2012/0102006 A1* | 4/2012 | Larson | G06F 17/30575 |
| | | | 707/703 |

OTHER PUBLICATIONS

Transactions; obtained at http://apacheignite.readme.io/v1.0/docs/transactions; downloaded Nov. 5, 2015; 6 pages.

* cited by examiner

FIG. 3

SINGLE UNIT OF WORK

BACKGROUND

The present application relates to computing and more specifically to software and accompanying systems and methods for configuring and using groups or sets of database transactions or computer processing functions or tasks.

Software for facilitating construction and use of groups of software functionality, including database transactions, User Interface (UI) display screen components, and so on, are employed in various demanding applications, including web applications for generating composite UI display screens using input from multiple different web services; software installation wizards for installing multi-component software applications; cloud-based or networked enterprise applications involving coordinating implementation of database transactions and associated database updates; software development environments for networked enterprise applications and related concurrent computing applications, and so on.

Such applications often demand efficient, cost-effective, reliable, and user friendly mechanisms for facilitating adjusting software, e.g., UI, and/or database components, where the adjustments do not interfere with other components. Such applications may further demand efficient mechanisms for reducing software upgrade costs while minimizing interference between upgraded components and existing components.

Efficient systems and methods for facilitating configuration and use of selected groups of software components or transactions can be particularly important in networked enterprise applications, e.g., cloud-based software, which may leverage many disparate or distributed network resources (e.g., web services, APIs, databases, and so on). Such components may include end-user software customizations, custom UI display screen features, vendor-provided components, and so on. Such enterprise applications must often be readily adaptable and configurable to meet rapid changes in business needs.

To facilitate construction of software components and/or groups of customized components (often called transactions and/or compound transactions, respectively) configurable activity guides, wizards, or other self-guided processes are often employed. A collection of steps (associated with transactions and UI display screen components) of an activity guide may represent a self-guided process or compound transaction.

The activity guides may be developed to perform a group of transactions, where each transaction is associated with a UI display screen page, tab, or other UI display screen section or component. The activity guides may enable ordering of the activities or transactions. Components (also called sub-transactions) of a larger transaction (also called a compound transaction or group or collection of transactions herein) are linked together or otherwise grouped as steps, where the individual steps may or may not be interdependent. Individual steps are independent if their completion or processing does not depend upon completion or processing of one or more other steps in the collection of transactions.

However, conventionally, mechanisms for facilitating construction, implementation, and use of activity guides has been problematic. For example, when a particular step of an activity guide fails, other dependent steps may also fail, even if such dependent steps may otherwise be useful when operating independently.

Furthermore, incorporation of a component transaction (i.e., sub-transaction) of an activity guide may require costly customization or modification of each component so as to enable efficient operation as part of the activity guide. Furthermore, inclusion of a component within a particular activity guide may sometimes require exclusion of use of that component by other network resources, e.g., software applications. In addition, developers and end users often experience problems when attempting to adjust the behavior of activity guides to properly react to the failure of a dependent step of the activity guide.

Conventionally, all steps of an activity guide or compound transaction are completed in a particular sequence, and the user is prevented from transitioning to a subsequent step until a previous step is completed. However, this may prevent completion of certain steps, the completion of which may otherwise be useful, despite whether the other steps of the group of steps have been completed. This can result in data and software maintenance problems.

Overcoming this issue may require customization and configuration of existing activity guides by adding custom code (e.g., JavaScript) to add new UI display screen controls and functionality for each step, so as to enable different types of save or commit operations to be assigned to the different UI display screen controls. However, such manual customization may be prohibitively costly.

SUMMARY

An example method facilitates construction and operation of a compound transaction. The example method includes presenting a first User Interface (UI) mechanism enabling user selection of plural component transactions to be included in a first compound transaction; providing a second UI mechanism enabling user specification of atomicity of the first compound transaction; displaying a third UI mechanism enabling user initiation of a first save operation for each specification of each component transaction of the plural component transactions of the first compound transaction; illustrating a fourth UI mechanism enabling user initiation of a second save operation for the entire first compound transaction; and in response to user initiation of the second save operation, ascertaining whether each component transaction has been saved; determining atomicity of the compound transaction; and implementing all or no database operations specified via the first compound transaction when the plural component transactions have been saved; when all component transactions have completed logic processing associated therewith; and when the compound transaction is indicated as atomic.

In a more specific embodiment, the example method further includes presenting a fifth UI mechanism enabling user selection of the first compound transaction as a component transaction of a second compound transaction, thereby enabling nesting of groups of transactions that results in a hierarchy of transactions. In the hierarchy of transactions, each child transaction of a parent transaction in which the child transaction is nested represents a child component transaction of the parent transaction.

The child component transaction may include or represent a custom transaction. Furthermore, one or more customizations made to the parent transaction of the child component transaction may include one or more customizations that do not affect operation of business logic processing associated with one or more steps of the child component transaction.

The example method may further include further presenting a sixth UI mechanism that enables a user, e.g., developer, to specify one or more atomicity relationships between component transactions of a sub-group of component transactions of the compound transaction. When two or more component transactions of the sub-group of component transactions are specified as atomic, then database operations associated with the component transactions are either all implemented, or none are implemented, after two or more component transactions have completed associated business logic processing.

Operations of the first compound transaction include performing business logic processing associated with each component transaction of the first compound transaction. The example method may further include storing results of business logic processing in advance of performing database operations associated with the business logic processing for each component transaction.

The example method may further include specifying the results of the business logic processing for the first compound transaction as a linked list of steps; and implementing one or more database operations indicated by the linked list of steps after business logic processing completes. The one or more database operations may include one or more database commit operations associated with saving data in accordance with the results of business logic processing.

An alternative example method facilitates developing a software application User Interface (UI) display screen. The alternative example method includes providing a first UI mechanism enabling specification of a container for a compound transaction; providing a second UI mechanism enabling specification of one or more properties of the container, the one or more properties including atomicity of the container; and providing a fourth UI mechanism enabling addition or removal of one or more component transactions to the container, a collection of component transactions within the container representing the compound transaction.

A second alternative example method facilitates user interaction with a set of transactions. The second alternative example method includes selectively presenting one or more UI display screen sections, each UI display screen section representing a component transaction of a compound transaction; providing one or more user options to alter and save data or settings associated with each component transaction, wherein user selection of an option to save data associated with a component transaction results in saving of content of the component transaction via a buffer mechanism; and providing a user option to submit data pertaining to all component transactions of the compound transaction to a database, the compound transaction being an atomic, and the data pertaining to all component transactions delivered to the data base via the buffer mechanism.

A third alternative example method facilitates selective transfer of data to a database. The third example method includes selectively retrieving data from a component transaction of a compound transaction in response to detection of a user-initiated save operation associated with the component transaction; storing the data in a linked list; detecting user initiation of a save operation pertaining to the entire compound transaction; and in response to the detecting, committing either all or none of the data pertaining to one or more component transactions from the buffer to a database, depending upon a predetermined atomicity setting associated with the compound transaction. The linked list may be maintained via a web server, and the database may communicate with an application server that communicates with the web server. The application server may run a DataBase Management System (DBMS).

Hence, certain embodiments discussed here enable configuration of user-interactable elements (e.g., component transactions) from a set of multiple transactions, using the business logic from existing transactions to process the elements, but deferring any save processing until the business logic has completed successfully before committing data associated with the elements of the set of multiple transactions to the database. Use of a container to wrap compound transactions, the container of which can have settings that operate irrespective of settings associated with component transactions, enables efficient use and grouping of database component transactions.

A further understanding of the nature and the advantages of particular embodiments disclosed herein may be realized by reference of the remaining portions of the specification and the attached drawings.

BRIEF DESCRIPTION OF THE DRAWINGS

FIG. 3 illustrates a second example UI display screen with UI controls enabling a developer to specify and establish properties of the compound transaction of FIG. 2.

DETAILED DESCRIPTION OF EMBODIMENTS

Figure 1:
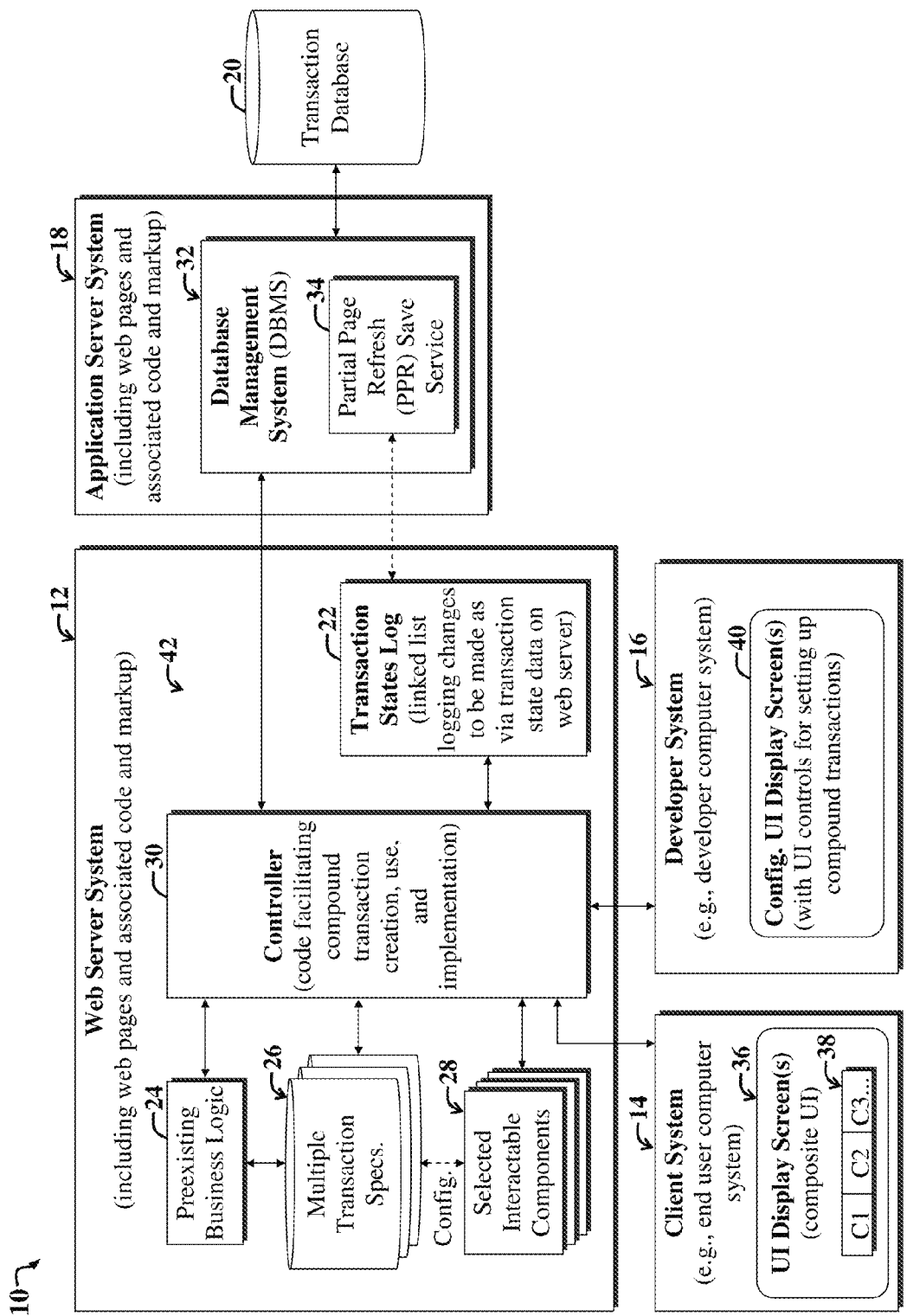
FIG. 1 is a block diagram illustrating a first example system and accompanying enterprise computing environment configured to enable development, deployment, and use of compound transactions.

For the purposes of the present discussion, an object may be may be any grouping of or encapsulation of data and/or functionality. Examples of objects include classes or structures implemented via object-oriented programming languages; tables, rows, or records of a database; and so on. Similarly, a database may be any collection of one or more objects. Accordingly, if one or more objects are represented via a file (e.g., a text file, eXtensible Markup Language (XML) file, JavaScript Object Notation (JSON) file, etc.) the file may be called a database for the purposes of the present discussion. A business object may be any object used to maintain and/or provide business-related data and/or functionality.

A transaction may be any instance of or occurrence of one or more events, units of work, or processing steps and/or associated data related to an activity or process, e.g., business activity, and which may be grouped based on the activity or process. Similarly, transaction data may be any data characterizing or associated with an object, e.g., a business object, used as part of the transaction.

Note that the term "transaction" as used herein may have a different meaning than the conventional notion of a database transaction. Conventionally, a database transaction may be any change in a database associated with a unit of work, whereas, as the term "transaction" is used herein, a transaction may include data and functionality associated with a business object, and need not refer specifically to the operation of committing the business object for storage in a database. For example, depending upon the context in which the term "transaction" is used herein, the transaction may refer to a particular unit of work; a particular corresponding UI display screen section for enabling user interaction with the transaction; the combination of several disparate units of work via a transaction container; data maintained in one or more objects associated with the transaction, and so on, as discussed more fully below.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for an enterprise. An enterprise may be any organization of persons, such as a business, university, government, military, and so on. The terms "organization" and "enterprise" are employed interchangeably herein.

An example enterprise computing environment includes various computing resources distributed across a network and may further include private and shared content on intranet web servers, databases, files on local hard discs or file servers, email systems, document management systems, portals, and so on. The terms "computing system" and "computing environment" may be used interchangeably herein.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include web services managers, service buses, E-business suites, process managers, notification servers, domain administration software, various types of middleware, including Application Programming Interfaces (APIs), and so on.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain herein. For the purposes of the present discussion, a computing domain may be any collection of one or more servers running software that is managed by a single administrative server or associated application. An example of a computing domain is a WebLogic Server (WLS) domain.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices via the Internet.

Note that conventionally, certain enterprise software customers (e.g., enterprises using the enterprise software) may subscribe to and access enterprise software (e.g., Enterprise Resource Planning (ERP) software) by subscribing to a particular suite of cloud services offered via the enterprise software. Various components of the enterprise software may be distributed across resources (e.g., servers) of a network.

Software development tools, i.e., toolsets, for modifying the supplied enterprise software may be delivered with the enterprise software and associated services. This facilitates customer initiated customizations, modifications, or replacements of certain components of the delivered enterprise software, called the core software application herein. Large enterprises may make thousands of customizations to a delivered core software application or application suite.

Accordingly, analyzing customizations and ensuring that no critical or undesirable conflicts arise when applying a new patch or upgrading the core applications, can be particularly important, but also costly and time consuming. Certain embodiments discussed herein facilitate analysis and handling of custom objects, and may enable informed decisions pertaining to future upgrades, maintenance events, and used customizations, as discussed more fully below.

The custom components, also simply called customizations or custom objects herein, may interact with core software. The core software may be maintained, patched, upgraded, or otherwise modified along with various components. A given modification to the software, e.g., as may occur during an upgrade, can affect, i.e., impact the functioning of components and the core system, and vice versa. An impacted custom component can be one which, for example, is rendered inaccurate, non-functional, irrelevant, inefficient, redundant; or may otherwise be undesirable to include in its present form in the core software after the core software has been changed.

Customizations often add cost and complexity to enterprise software upgrade projects and burden ongoing enterprise application support and maintenance. Effective customization tracking and analysis tools are needed to effectively reduce such costs and complexities and to enable enterprise customers to make informed decisions pertaining to software customizations and core software upgrades.

For clarity, certain well-known components, such as hard drives, processors, operating systems, power supplies, Internet Service Providers (ISPs), class loaders, bytecode compliers, Application Programming Interfaces (APIs), resource managers, and so on, are not necessarily explicitly called out in the figures. However, those skilled in the art with access to the present teachings will know which components to implement and how to implement them to meet the needs of a given implementation.

FIG. 1 is a block diagram illustrating a first example system 10 and accompanying enterprise computing environment configured to enable development, deployment, and use of compound transactions.

For the purposes of the present discussion, a compound transaction may be any collection or grouping of transactions, called component transactions of the compound transaction. In certain embodiments, the collection of component transactions may be a structured collection, such that components of the structure are arranged in accordance with or otherwise characterized by interdependencies between elements of the collection. For example, the structure may be such that the components exhibit hierarchical relationships, e.g., nested relationships. UI representations of such structures may include windows within larger windows; pages within sequences of pages; tabs within larger tabs, sub-folders within folders, and so on.

A container for a compound transaction may be any mechanism for encapsulating, grouping, or otherwise defining what is included in the compound transaction, such that what is included in the transaction container is what is included in the compound transaction.

Certain embodiment discussed herein enable developer configuration of settings of the transaction container, such that the settings will apply to the collection of the component transactions (i.e., the compound transaction), without affecting individual operation of each individual component. An example compound transaction setting (i.e., a setting applied to a container defining the compound transaction) that may be implemented in accordance with various embodiments discussed herein includes an atomicity setting (also called a Single Unit of Work (SUOW) setting), as discussed more fully below.

With reference to FIG. 1, note that groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, the client system 14 and the developer system 16 may be implemented via the same computer, without departing from the scope of the present teachings. Furthermore, certain server-side modules (i.e., running on a server or server system) may be implemented client-side (e.g., running on a client computer communicating with a server), and vice versa, in a manner different than shown in FIG. 1.

The example system 10 includes a web server system 12 in communication with an application server system 18, each of which may include one or more servers or server clusters. The web server system 12 communicates with an example client system 14 and a developer system 16. The client system 14 may represent an end user computer system that runs a browser for browsing to and accessing web-based compound transaction functionality 42 via a composite UI display screen 36 that includes several sub-screens corresponding to steps (i.e., component transactions) of an accompanying activity guide 38 (where the activity guide represents a compound transaction), as discussed more fully below.

Similarly, the developer system 16 may be a computer system 16 used by a developer and which runs a browser for accessing compound transaction configuration features provided via the functionality 42 running on the web server system 12. The browser displays one or more configuration UI display screens 40, with UI controls or other mechanisms or options for enabling a developer to specify properties for a compound transaction; to further specify component transactions to include or remove from a given compound transaction; and so on.

For the purposes of the present discussion, software functionality may be any capability or feature that is provided via computer code, i.e., software. Software functionality is often accessible via use of a UI and accompanying UI controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

A UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen (also simply called screen herein) may refer to all application windows presently displayed on a display.

A UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

The compound transaction functionality 42 running on the web server system 10 includes a controller module 30 in communication with preexisting business logic 24, transaction specifications 26 for various different transactions available to the system 10, developer selected and configured component transactions 28, and a transaction states log 22.

The controller 30 includes computer code facilitating compound transaction creation, use, and implementation, and further includes interfacing code (e.g., one or more APIs, services, etc.) for handling communications with the client system 14, developer system 16, various modules 22-28 of the web server system 12, and with an application server system 18. The example application server system 18 runs a DataBase Management System (DBMS) application 32 that communicates with the controller 30 running on the web server system 12 and a backend transaction database 20 or repository.

The DBMS 32 may include or communicate with various services and/or APIs, including a Partial Page Refresh (PPR) save service 34, which may facilitate committing data and/or fetching data to and/or from the transaction database 20 in response to communications with the controller 30, as discussed more fully below.

In an example scenario, a developer employs the developer system 16 and accompanying configuration UI display screen 40 to setup a compound transaction as an activity guide 38 accessible to the client system 14 with several component transactions corresponding to action items and respective UI display screen sections, also called UI display screen elements or components.

The developer employs the UI display screen 40 to browse to a website hosting the controller 30. The controller 30 responds to developer-specified configuration settings associated with a compound transaction. The configuration UI display screen 40 includes various UI controls for enabling a developer to further specify what component transactions should or should not be included in the compound transaction.

The controller 30 then uses the developer-provided specifications to identify or otherwise select components 28 from among plural preexisting transaction 26, the general computer code for which is accessible to preexisting business processing logic 24. Selected component transactions 28 (which may represent components and associated functionality with which an end user may interact and which may or may not exhibit interdependencies, and/or may represent sub-groups of child compound transactions of a parent compound transaction) are wrapped with a compound transaction container corresponding to a compound transaction that includes the selected component transactions 28.

After configuring and instantiating (e.g., deploying) a configured compound transaction (e.g., activity guide) via the developer system 16, the client system 14 may then enter a Uniform Resource Locator (URL) to access the compound transaction via the client UI display screen 36 and accompanying controller 30.

For the purposes of the present discussion, an activity guide may be a type of compound transaction where components (e.g., sub-transactions) of a larger transaction (also called a collection of transactions herein) are tied together or otherwise grouped as steps, where the individual steps may or may not be interdependent. Individual steps are independent if their completion or processing does not depend upon completion or processing of one or more other steps in the collection of transactions.

The user-selected compound transaction is then represented in the client UI display screen 36 via the activity guide 38. The end user then follows steps of the activity guide 38, each step of which represents or corresponds to a component transaction of the associated activity guide 38. Note that in certain implementations, steps or action items (e.g., labeled C1-C3 in FIG. 1) of the activity guide 38 are completed and saved sequentially; however, implementations are not limited to sequential completion of steps. For example, in certain implementations, steps may be performed in parallel, and UI display screen sections pertaining to each step may appear simultaneously in the client UI display screen 36.

If the developer of the activity guide 38 has specified (e.g., via configuration settings) that the activity guide 38 is atomic, i.e., represents a single unit of work, then save processing performed at each step of the activity guide 38 involves buffering any changes made to the associated component transactions (and underlying respective business objects) via the transaction states log 22.

The transaction states log 22 may be implemented via a linked list of states corresponding to different steps (e.g., component transactions) of the activity guide 38 (e.g., compound transaction). The states include information specifying which changes have been made (e.g., changes to data or settings) to each component transaction. For the purposes of the present discussion, a linked list may be any ordered or partially ordered structure or sequence of nodes or items, e.g., component transactions and associated steps and accompanying data.

After changes made at each step of the activity guide 38 have been saved and validated, and the user has navigated to a final step of the activity guide 38, a second save option, also called a compound transaction submit option, enables a user to save the entire adjusted compound transaction. For atomic compound transactions (i.e., compound transactions that represent a single unit of work), then upon user selection of the submit option, the controller determines whether all steps of the activity guide 38 have been saved and/or validated, and then triggers a commit operation. If all steps have not been validated, then no data from the transaction states log 22 is committed to the transaction database 20.

In general, save processing involving the committing of data to the transaction database 20 is deferred until business processing logic 24 associated with each component transaction (i.e., activity guide step) is complete. The business processing logic 24 may include, for example, calculations based on changed data supplied by a user for a particular component transaction. Calculation results may appear on or be reflected in a page or UI section corresponding to a component transaction that has been saved at an intermediate step of the activity guide 36.

In general save processing involving committing of data pertaining to all steps of the compound transaction 36 to the transaction database 20 is deferred until bus logic completes 24 completes. The deferral is accommodated via the transaction states log 22 in communication with validation and initial save processing associated with each activity guide step, i.e., each component transaction.

In preparation for the commit operation, data for the compound transaction 22 is transferred to the application server 18, e.g., via the controller 30. The controller 30 may pass transaction log information to one or more services 34 (e.g., Partial Page Refresh (PPR)) and accompanying DBMS 32 in preparation for writing, i.e., committing, data for the compound transaction to the transaction database 20.

More specifically, the controller 30 includes code for facilitating obtaining transaction state information maintained on the web server system 12; then serializing the states to the application server 18; starting a database transaction (e.g., via signaling with the DBMS 32); processing the states one by one; and then updating the database. However, when the associated Single Unit Of Work (SUOW) setting, i.e., atomicity setting, is on, then the compound transaction is only submitted if all save operations as to component transactions have successfully completed. All states that correspond to steps of an activity guide and that are maintained via the transaction states log 22 are grouped as linked lists to facilitate SUOW functionality discussed herein.

The controller 30 may further include code for instructing the PPR service 34 on the application server to feed deserialized component states as a vector array to the DBMS 32 for easy storage in the transaction database 20.

In summary, different component transactions and associated states of the activity guide 38 may be updated and modified, in series, or in a different order, before the states are finally submitted to toe application server system 18 for committal to the transaction database 20. If a user makes a particular change to a component transaction (e.g., activity guide step) and then revisits the component transaction (e.g., via a corresponding UI display screen section or component) to make further adjustments, then the state information pertaining to the transaction is retrieved from the transaction states log 22 and presented to the user, thereby enabling the user to make changes to recent data, despite whether or not the component transaction has been committed to the transaction database 20.

Hence, even if a user returns to a component transaction that has not been committed to the transaction database 20, the user may still be able to retrieve recent data for that component transaction via the transaction states log 22. In such a case, the controller 30 may return to the transaction states log 22, and then based on the URL of the component transaction, retrieve the last saved state for the component transaction. The state includes information specifying any recent changes to the component transaction, even if the changes are not in the transaction database 20 under that particular component transaction. When a final save, i.e., submit, for the compound transaction corresponding to the activity guide 38 is triggered, then data for all of the component transactions of the compound transaction is committed to the database 20 approximately simultaneously.

Figure 2:
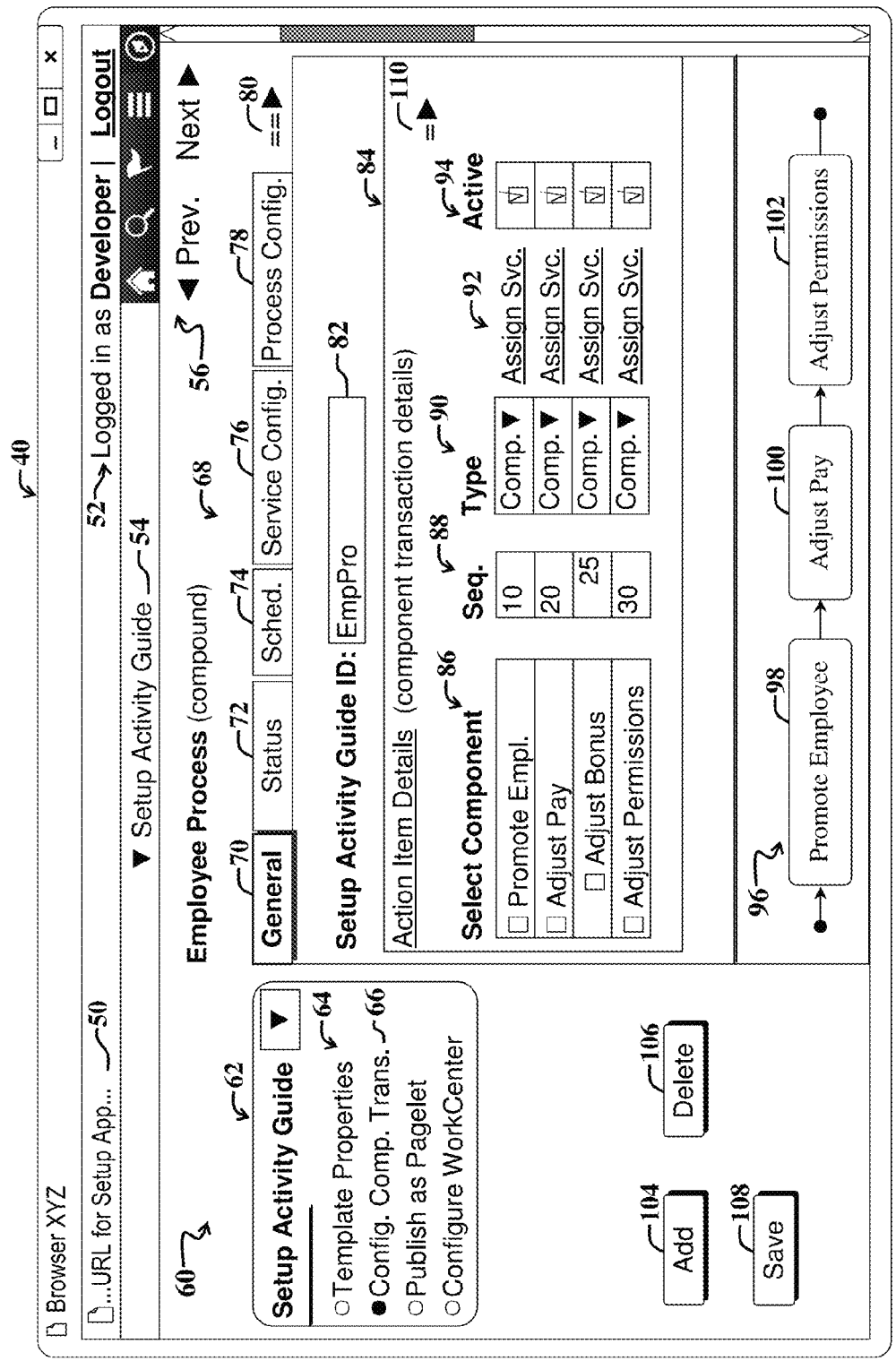
FIG. 2 illustrates a first example User Interface (UI) display screen, which may be implemented via the system of FIG. 1, with UI controls enabling a developer to select component transactions to be included in a compound transaction.

FIG. 2 illustrates a first example developer UI display screen 40, which may be implemented via the system 10 of FIG. 1, with UI controls (e.g., controls 86) enabling a developer to select component transactions of a compound transaction. The first example developer UI display screen 40 may correspond to or be included among the UI display screen(s) 40 of FIG. 1.

With reference to FIGS. 1 and 2, the first example UI display screen 40 may be implemented via a browser window, which includes an address field for entering a URL 50 to access compound setup functionality provided via the server-side functionality 42 running on the web server system of FIG. 1. The developer may log into the website hosting the compound transaction functionality, as indicated by an example log-in indicator 52. Additional UI controls 56, e.g., for facilitating navigating, searching, and accessing settings for the associated web application may also be provided.

In the present example embodiment, a developer has employed the resulting loaded web application (used to generate UI display screen mechanisms and features 60) to select a setup activity guide option 54, the selection of which triggers display of various UI display screen mechanisms and features 60. The mechanisms 60 include an activity guide legend 62 with selectable items 64.

In the present example embodiment, a developer has selected a configure compound transaction option 66, which results in display of a configuration UI section 68 with various UI controls and associated options enabling configuration of a compound transaction. Configuration of the compound transaction may include adding and/or selecting and removing components from a compound transaction.

In the present example embodiment, an initial compound transaction has been set up. The initial compound transaction is graphically represented via an activity guide map 96, which shows a first component transaction corresponding to a promote employee activity indicator 98, a second component transaction corresponding to an adjust pay activity indicator 100, and a third component transaction corresponding to an adjust permissions activity indicator 102.

The example configuration UI section 68 includes various tabs 70-78, including a currently-selected general tab 70, a status tab 72, a scheduling tab 74, a service configuration tab 76, and a process configuration tab 78. Note the exact names, types, and numbers of tabs or UI sections provided in the UI section 68 are implementation specific and may vary, without departing from the scope of the present teachings. A tab-scrolling control 80 may facilitate scrolling of the tabs 70-78 to reveal more selectable tabs.

In the present example embodiment, the general tab 70 is selected, which triggers display of various UI controls and sections 82-94, 110 thereof. The body of the general tab 70 illustrates a first control 82 for enabling a user to specify or select an activity guide identification (ID) for the current activity guide, i.e., compound transaction.

A details section 84 includes various columns 86-94 of selectable UI controls and associated options. The example columns 86-94 include a component selection column 86, a component sequence number column 88, a component type column, a service assignment column 92, and an active status column 94. Each row of the columns 86-94 maintains data pertaining to a particular component transaction listed in the first component selection column 86. Additional columns may be included or otherwise accessed (e.g., via a horizontal scroll control 110), without departing from the scope of the present teachings.

When a developer wishes to adjust settings and configuration options for a particular component transaction, the developer may check a box next to a component transaction listed in the component selection column 86. After one or more check boxes are checked, i.e., selected in the component selection column 86, then further interaction with various UI controls apply to those selected components.

For example, if a developer wishes to remove the promote employee activity 98 from the activity guide 96 representing the compound transaction, the user may check a box next to "Promote Employee" in the component selection list 86, and then select a delete button 106 to delete the associated component. Deletion of the associated component removes it from the activity guide 96.

Similarly, to add a component transaction to the activity guide 96, a user may select one or more items from the component selection column 86, and then select an add button 104. A representation or indicator of the selected component then appears in the activity guide map 96.

Alternatively, only components appearing in the activity guide map 96 appear as selectable options in the component selection column 86. In such implementations, developer selection of the add button 104 may trigger display of an additional list of existing transactions which can then be selected and added to the component selection column 86 and associated activity guide map 96.

In another alternative implementation, a drag-and-drop feature may enable dragging transactions from a list into the activity guide map 96 and/or details section 84, thereby triggering addition of the dragged component to the compound transaction represented by the activity guide. User selection of the save button 108 may trigger saving of all settings and changes to settings implemented via the UI display screen 40.

A single transaction may include of one or more units of work (e.g., action items, also called activities, processes, or steps herein), each unit of work eventually involving reading and/or writing information to a database or other storage mechanism (e.g., linked list). When all steps of the transaction must successfully complete (e.g., data associated therewith committed to a database) as a precondition for any steps completing, the transaction is said to represent a single unit of work. Such an all or nothing condition is called an atomic condition, and the associated transaction is called an atomic transaction. Also, the transaction is said to exhibit atomicity.

The activity guide represented via the activity guide map 96 and configured via the UI display screen 40, represents an example compound transaction that includes component transactions. The component transactions include an employee promotion process, which may involve, for example, a Human Resources (HR) administrator entering employee information, e.g., new job position, title, etc., into a section of a UI display screen corresponding to the transaction. Related transactions may include an employee salary adjustment activity or process, a benefits adjustment process, and so on.

In certain implementations, an enterprise may wish to combine several related action items, steps, or processes. These may be combined into a compound transaction, e.g., by using a transaction container, wherein the container is associated with an atomic property, i.e., exhibits atomicity as it pertains to all steps or component transactions included in the container.

In general, for an atomic transaction, a series of database operations either all occur, or nothing occurs. Two transactions are said to be interdependent if the processing of a first transaction depends upon the processing of a second transaction. If the dependency is such that the first transaction must both be complete, or none of the transactions can complete or perform a database operation, the interdependency is said to include or represent atomicity.

Note that transactions that may otherwise be considered independent (such that individual processing steps of one transaction do not depend upon individual processing steps of another transaction), may still require "all or nothing," (i.e., atomic) completion as a group, depending upon the needs of a given implementation or application.

For example, a first component transaction may be "promote employee," while a second component transaction may be "assign a raise," where both associated processes may operate independently. Accordingly, certain component transactions may be independent, but atomicity may be assigned to a compound transaction to meet the needs of a given implementation. In summary, when atomicity is assigned to an entire compound transaction, then the results of the compound transaction are submitted to a database only when all sub-transactions, i.e., component transactions, successfully complete.

In the present example embodiment, an "adjust pay" transaction component transaction listed in the component selection column 86 is shown as including a sub-component called "adjust bonus." Accordingly, the "adjust pay" component transaction (also represented by the adjust pay indicator 100 in the activity guide map 96) also represents a compound transaction. The compound transaction represented by the "adjust pay" component represents a child compound transaction of a parent compound transaction represented by the activity guide that includes promote employee 98, adjust pay 100, and adjust permissions 102 as sub-steps.

Hence, certain embodiments discussed herein enable nesting of component transactions within other component transactions, wherein each component transaction may itself be a compound transaction. This can result in hierarchical structures of activity guides that may be included in a given activity guide. With large hierarchical structures, which may be represented via a tree diagram (or set of nested folders, tabs, windows, etc.), certain branches of the tree may be assigned certain settings, e.g., atomicity, whereas other settings may not apply specifically to those branches. Certain settings applicable to a particular branch may be established by including the branch in a compound transaction container and then allocating settings to the container, which wraps component transactions via the container to yield a compound transaction.

Figure 3:
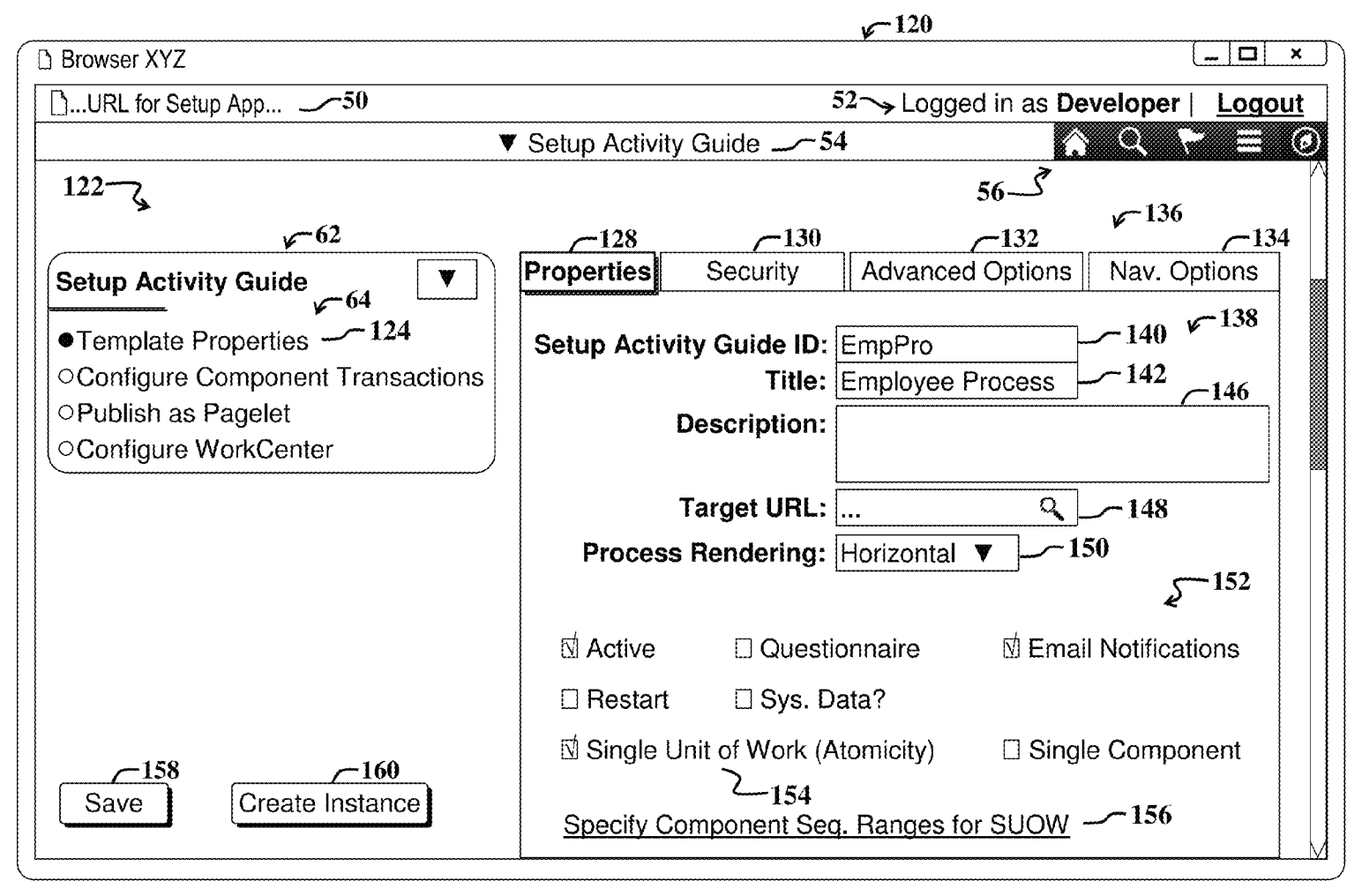

FIG. 3 illustrates a second example UI display screen 120 with various UI features and mechanisms 122 enabling a developer to specify and establish properties of the compound transaction represented by the activity guide map 96 of FIG. 2. Properties of a compound transaction may be visualized as applying to a container that accommodates component transactions therein.

Display of the second UI display screen 120 may be triggered by user selection of a template properties option 124 from among the selectable items 64 of the activity guide legend 62. This triggers display of a resulting set of compound transaction container configuration tabs 136, including a presently selected properties tab 128, a security tab 130, an advanced options tab 132, and a navigation options tab 134. Note that the exact names, numbers, types, and layouts for each table 128-134 are implementation specific and may vary, without departing from the scope of the present teachings.

The body of the currently selected properties tab 128 includes various UI controls or mechanisms 138, such as a first control 140 for specifying an activity guide ID; a second control 142 for specifying a title for the activity guide; a description section 146 for adding a description (which augments metadata associated with the activity guide, i.e., compound transaction); a target URL control 148 for enabling specification of a target URL to be entered by an end user (e.g., via the client UI display screen 36 of FIG. 1) to access the activity guide; a rendering orientation control 150 for enabling selection of horizontal, vertical, or other rendering orientation for steps of the activity guide; and various selectable settings 152.

In the present example embodiment, the selectable settings 152 include various check boxes, including a single unit of work check box 154. Selection of the single unit of work check box 154 configures the associated compound transaction container to activate atomic, i.e., all or none, database commit operations for all component transactions within the container defining the compound transaction, i.e., activity guide.

An additional example UI control 156 is responsive to user selection to trigger display of another UI display screen with controls for enabling a user, e.g., developer to specify ranges of sequence numbers allocable to component transactions as being atomic ranges or not. A component transaction that is assigned a sequence number in an atomic range will be automatically included in a group of transactions corresponding to the range, where the group of transactions represents an atomic compound transaction, also called a single unit of work compound transaction. The compound transactions associated with particular sub-ranges of a larger compound transaction represent child transactions of the larger compound transaction, which is called the parent compound transaction.

In embodiments where not all of the component transactions should be treated as atomic by a compound transaction container encapsulating the component transactions, then the compound transaction is not necessarily (but can be) assigned the single unit of work property 154, i.e., the option 154 may appear unavailable. Nevertheless, other settings established for the compound transaction may apply to the compound transaction, even if the compound transaction is not entirely comprised of atomic component transactions.

User transitioning between different component transaction UI display screen sections and child compound transactions may be controlled by configuration of warning boxes or other mechanisms appearing when the user transitions between sections. For example, when a user completing an activity guide completes a child compound transaction that is atomic and then wishes to transition to completing another component transaction, a warning may appear indicating that the user must first save all component transactions of the compound transaction before proceeding. If the user fails to heed this warning, a sequence of such warnings may appear upon user selection of a final submit (also called the second save operation herein) for all component transactions of the parent compound transaction.

Additional example UI controls 158, 160 are shown, and include a save button 158 and a create instance button 160. Developer selection of the save button 158 results in saving of changes made via the UI display screen 120. Selection of the crate instance button 160 may trigger automatic code generation and compilation as needed to enable running of software for presenting interactable UI display screen features (e.g., corresponding to features 38 of the client UI display screen 36 of FIG. 1) corresponding to the compound transaction, as discussed more fully below with reference to FIG. 4.

Figure 4:
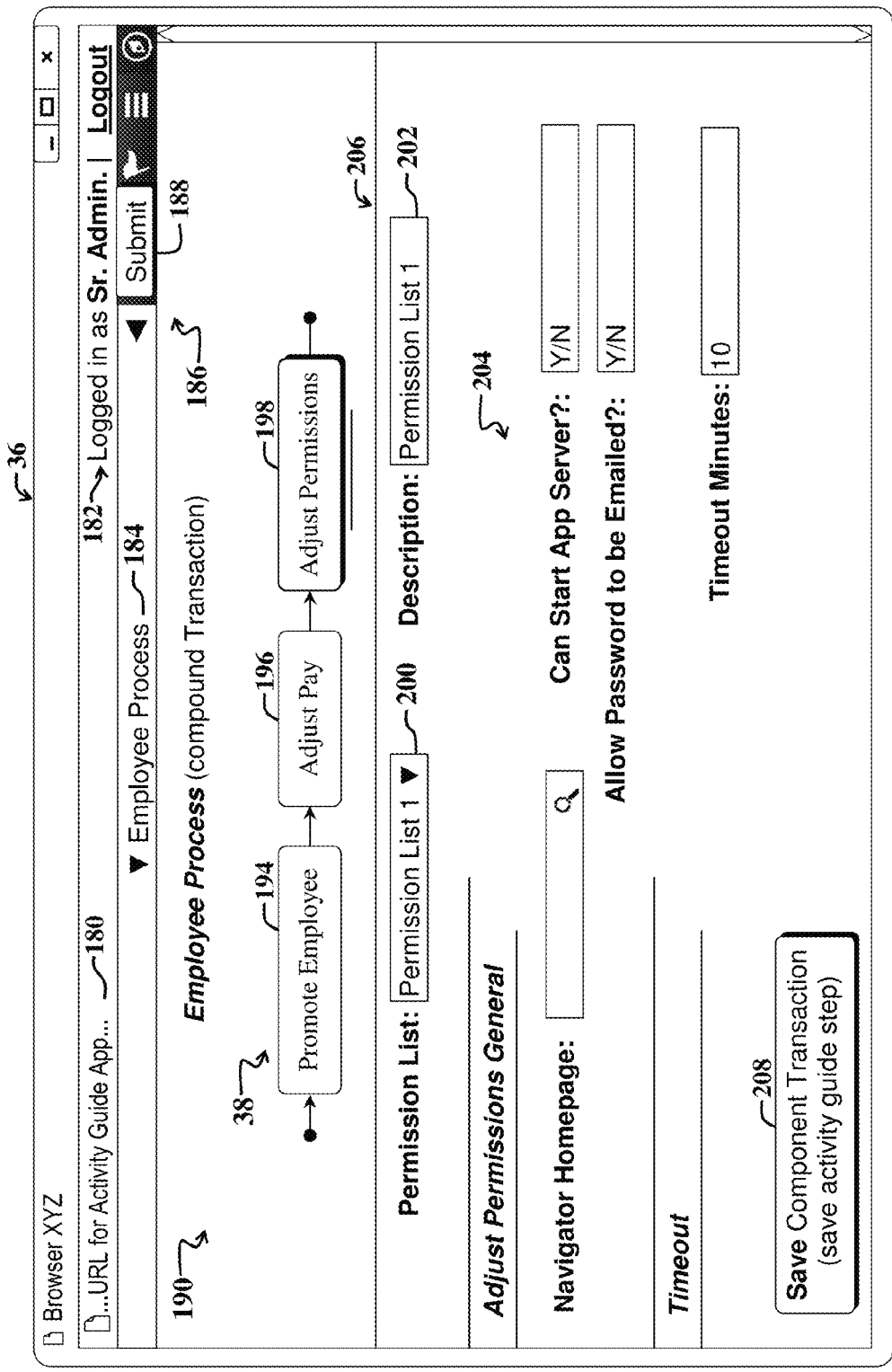
FIG. 4 illustrates a third example UI display screen showing an example composite UI display screen facilitating user interaction with the compound transaction of the UI display screens of FIGS. 2-3.

FIG. 4 illustrates a third example UI display screen 170 representing an example composite UI display screen that facilitates user interaction with the compound transaction of the UI display screens 40, 120 of FIGS. 2-3 using various features and mechanisms 190 of pages or sections corresponding to the component transactions (e.g., corresponding to steps 194-198 of an activity guide map 38) setup via the UI display screens of FIGS. 1-2.

In the present example embodiment, an end user has entered a URL 180 to access a web application that enables user selection of an employee process 184, and has logged in as a senior HR administrator, as indicated via login information 182. The selected employee process compound transaction is represented by an activity guide, which is represented by an activity guide map 38. The activity guide map 38 includes user selectable items 194-198, each representing steps of the associated activity guide (called Employee Process in the present example).

When a user wishes to navigate between steps and trigger corresponding switching of content of the associated UI display screen section 206, the user may select the step by selecting either a promote employee option 194, an adjust pay option 196, or an adjust permissions option 198.

Currently, the user has performed steps 194, 196 prior to arriving at the currently selected adjust permissions step 198. The adjust permissions step 198 is the last step in the activity guide and is associated with a permissions UI display screen section or UI component corresponding to the component transaction of the adjust permissions step 198.

The example permissions section 206 includes a permission list UI control 200 for selecting a list of permissions; a description control 202 for describing the applicable permission list, and a general permissions section 204. The general permissions section 204 may enable end user configuration of permissions associated with a particular employee, e.g., permissions to access certain servers, permission settings specifying whether or not passwords can be emailed to the employee, and so on.

A first save button 208 is responsive to user input to trigger saving of data entered in association with the adjust permissions component transaction corresponding to the adjust permissions step 198 of the associated activity guide 38. This data may represent or include changes made using the various controls of the permissions section 206. However, note that change data pertaining to this initial save triggered by user selection of the first save button 208 is not initially committed to a back end database (e.g., the transaction database 20 of FIG. 1), but is instead committed to the transaction states log 22 as part of a link list defining the employee process activity guide.

In general, each step 194-198 of the activity guide represented by the activity guide map 38 will have a section that includes a save button that operates similarly to the first save button 208. Only after the last step, i.e., the adjust permissions step 198 is reached, with a second save button, also called a submit button 188 appear among additional controls 186 included for the activity guide.

With reference to FIGS. 1 and 4, user selection of the submit button 188 triggers an all or none operation, i.e., an atomic operation to commit data for all of the component transaction steps 194-198 as a single unit of work. To perform the final commit, also called the second save, after transaction processing completes and has been validated for each step 194-198, state change information is retrieved from the transaction states log 22 in preparation for delivery to the application server 18 and committal to the transaction database 20.

Figure 5:
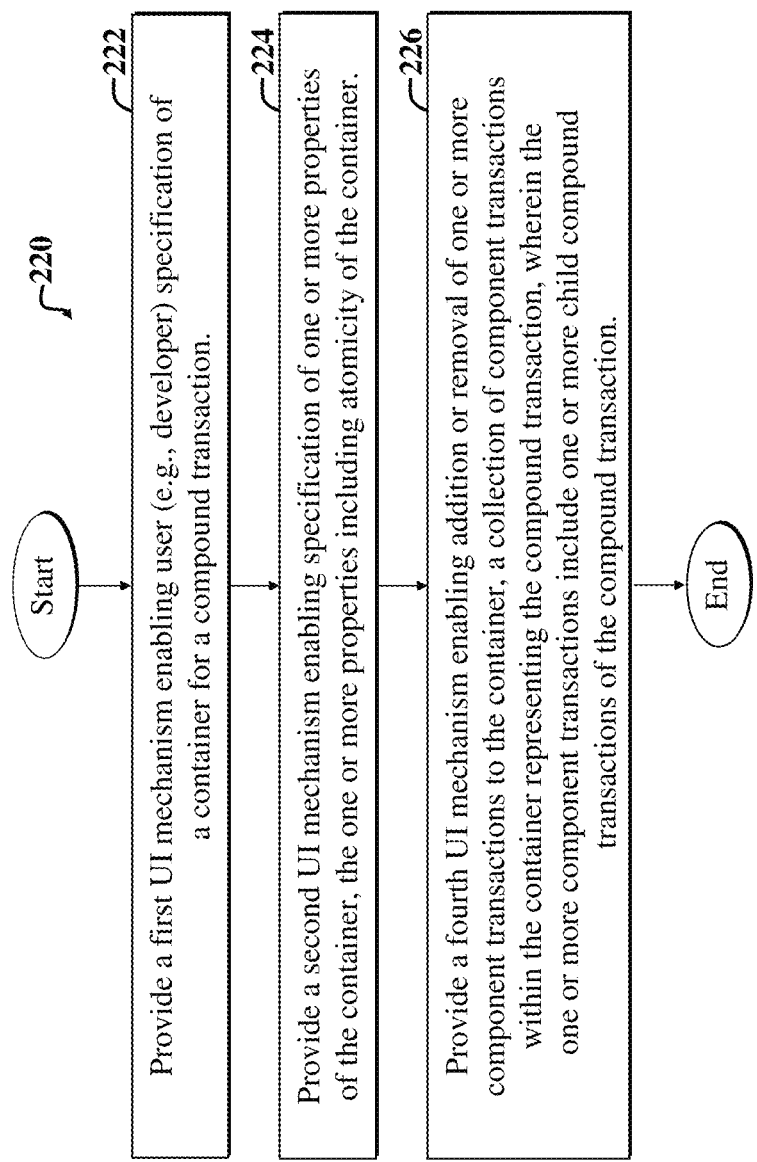
FIG. 5 is a flow diagram of a first example method suitable for use with the embodiments of FIGS. 1-4 from a developer perspective.

FIG. 5 is a flow diagram of a first example method 220 suitable for use with the embodiments of FIGS. 1-4 from a developer perspective. The example method 220 involves assigning atomicity to a group of steps, e.g., transactions, such that the steps either all successfully complete or none are committed to a back end database.

The example method 220 facilitates developing a UI display screen, and includes a first option-providing step 222, which involves providing a first UI mechanism enabling specification of a container for a compound transaction.

For the purposes of the present discussion, a UI mechanism may be any collection of one or more UI display screen features and/or functionality. Hence, in certain cases, certain UI mechanisms may include plural UI controls and associated software functionality characterizing a UI display screen. The plural UI controls and associated software functionality may be grouped by function, where the function is performed via or in response to the mechanism and/or input thereto and/or interaction therewith.

A second option-providing step 224 includes providing a second UI mechanism enabling specification of one or more properties of the container, the one or more properties including atomicity of the container.

A third option-providing step 226 includes providing a fourth UI mechanism enabling addition or removal of one or more component transactions to the container. Note that a collection of component transactions within the container represent the compound transaction. The one or more component transactions include one or more child compound transactions of the compound transaction.

Note that the method 220 may be modified, without departing from the scope of the present teachings. For example, the method 220 may be altered to further include enabling presentation of the compound transaction as a collection of one or more UI display screens representing one or more respective component transactions. The one or more UI display screens may be implemented as part of an activity guide.

The first example method 220 may further include providing a fifth UI mechanism enabling inclusion of the first compound transaction as a component transaction of a second compound transaction, the second compound transaction representing a parent transaction of the first compound transaction, thereby resulting in a hierarchy of transactions.

For the purposes of the present discussion, a hierarchy may be any arrangement of items (also called nodes of the hierarchy), e.g., software modules or components, programming language classes and sub-classes, data objects, names, values, categories, and so on. The items may be ordered or positioned such that they exhibit superior or subordinate relationships with related items in a set of items.

Note that depending upon the context in which the term "hierarchy" is used, a hierarchy may refer to a displayed representation of items (e.g., illustrated via nesting of items or components; a tree diagram, or other visualization mechanism) and/or may refer to items (e.g., business objects, transaction components, etc.) and accompanying relationships existing irrespective of the representation.

For example, an enterprise hierarchy, e.g., which may be displayed via an organizational chart (also called org chart) may refer to a particular chart or tree diagram and/or may refer to any power structure, position structure, or reporting structure characterizing an enterprise.

When discussing certain embodiments discussed herein, a component transaction is said to be hierarchically related to a compound transaction of which the component transaction is a part. In certain illustrations, the component transaction can be visualized as being contained by the compound transaction, the compound transaction of which may be characterized by a container and associated properties and/or functions that are to be applied to all component transactions within the compound transaction container.

The first example method 220 may further include providing a sixth UI mechanism enabling alteration of one or more containers accommodating one or more child compound transactions of one or more parent compound transactions, the one or more parent transactions including the one or more child transactions, without affecting properties of one or more containers defining the one or more parent transactions.

The first example method 220 may further include providing a seventh UI mechanism enabling alteration of one or more containers accommodating one or more parent compound transactions of one or more child compound transactions, the one or more parent transactions including the one or more child transactions, without affecting properties of one or more other containers defining the one or more child transactions.

The first example method 220 may further include including enabling execution of the compound transaction without affecting atomicity of individual component transactions of the compound transaction.

Furthermore, note that the method 220 may be replaced with another method for developing a UI display screen. For example, an alternative method include providing a first UI mechanism enabling specification of a container for a first compound transaction; providing a second UI mechanism enabling specification of one or more properties of the container, the one or more properties including atomicity of the container; and providing a fourth UI mechanism enabling addition or removal of one or more component transactions to the container, a collection of component transactions within the container representing the first compound transaction.

The alternative method may further include including providing a mechanism enabling presentation of the compound transaction as a collection of one or more UI display screens representing one or more respective component transactions. The one or more component transactions may each include one or more sub-transactions, whereby the one or more component transactions represent child compound transactions of a parent compound transaction, the parent compound transaction representing the compound transaction.

The alternative method may further include providing a fifth UI mechanism enabling user selection of a group of transactions to be included as a child component transaction of parent compound transaction; and providing a sixth UI mechanism enabling a user to specify whether the parent compound transaction is to be executed as a single unit of work, wherein the child component transaction of the parent compound transaction represents a child compound transaction of the parent compound transaction.

The alternative method may further include employing an activity guide to present one or more UI display screens having one or more UI controls for executing the parent compound transaction as a single unit of work; providing a seventh UI mechanism enabling addition of one or more component transactions to the compound transaction, without altering the atomicity of the compound transaction; providing an eighth UI mechanism enabling removal of one or more component transactions from the compound transaction, without altering the atomicity of the compound transaction; and providing a ninth UI mechanism enabling a user to specify a sub-group of component transactions of the compound transaction as being atomic, without affecting whether other component transactions of the compound transaction are atomic relative to each other.

Figure 6:
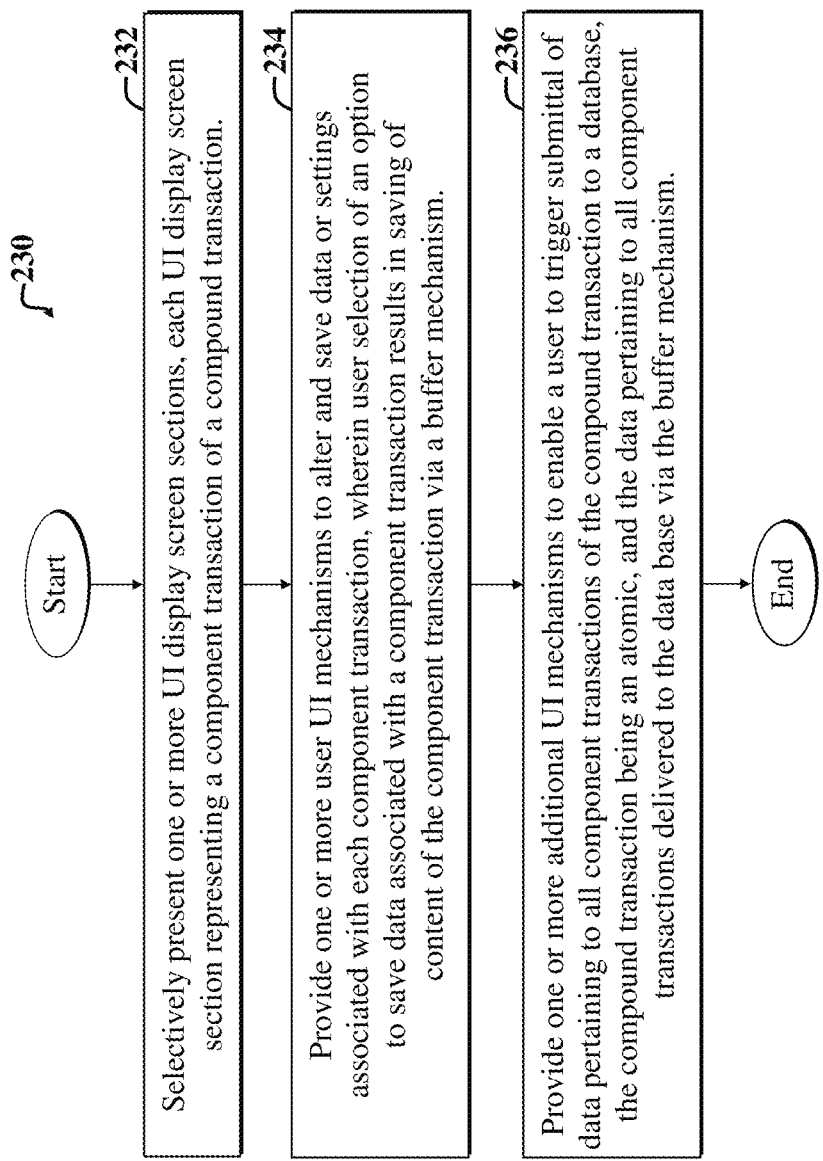
FIG. 6 is a flow diagram of a second example method suitable for use with the embodiments of FIGS. 1-4 from an end user perspective.

FIG. 6 is a flow diagram of a second example method 230 suitable for use with the embodiments of FIGS. 1-4 from an end user perspective, setting forth the nature of the way data is saved at each step of a compound transaction or activity guide.

The second example method 230 facilitates user interaction with a set of transactions, and includes a first presenting step 232, which involves selectively presenting one or more UI display screen sections, each UI display screen section representing a component transaction of a compound transaction.

A second providing step 234 includes providing one or more user options to alter and save data or settings associated with each component transaction, wherein user selection of an option to save data associated with a component transaction results in saving of content of the component transaction via a buffer mechanism.

A third providing step 234 includes providing a user option to submit data pertaining to all component transactions of the compound transaction to a database, the compound transaction being an atomic, and the data pertaining to all component transactions delivered to the data base via the buffer mechanism.

Note that the method 230 may be altered, without departing from the scope of the present teachings. For example, the method 230 may be augmented to further specify that the buffer mechanism includes a linked list of states characterizing data indicating changes made to data associated with the component transaction, wherein the linked list of states is maintained via a web server. The component transaction of the compound transaction may represent a child component transaction of the parent compound transaction.

The second example method 230 may further include providing child transaction components included within a parent compound transaction, thereby providing a hierarchy of components; representing the child transaction components and the parent compound transaction in a UI display screen; detecting a change made to the parent compound component; and selectively implementing the change without affecting the child components or interrelationships (e.g., dependencies) therebetween, while treating operation of the parent transaction as a unit of work exhibiting atomicity.

Figure 7:
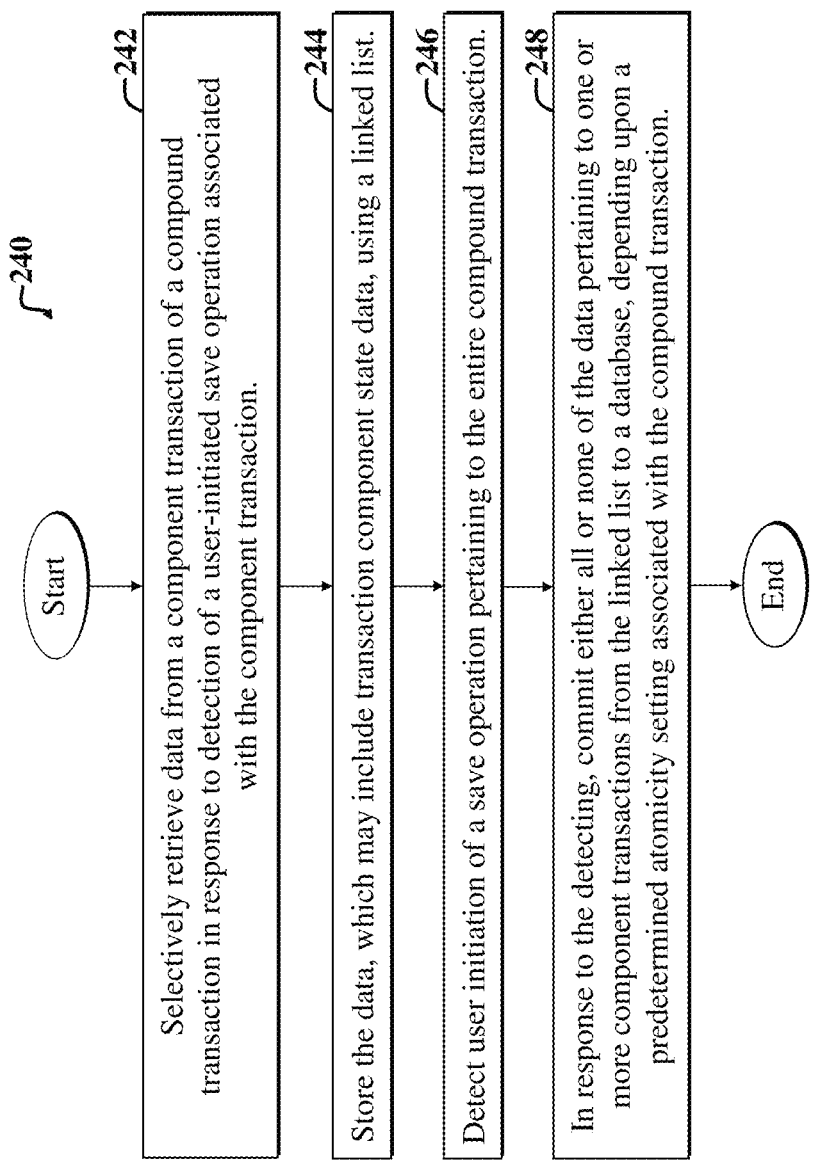
FIG. 7 is a flow diagram of a third example method suitable for use with the embodiments of FIGS. 1-6 from an implementation perspective.

FIG. 7 is a flow diagram of a third example method 230 suitable for use with the embodiments of FIGS. 1-6 from an implementation perspective. The third example method 230 facilitates selective transfer of data to a database.

The third example method 230 includes a first retrieving step 232, which involves selectively retrieving data from a component transaction of a compound transaction in response to detection of a user-initiated save operation associated with the component transaction.

A second storing step 244 includes storing the data in a linked list, which may include component transaction state and change data.

A third detecting step 246 includes detecting user initiation of a save operation pertaining to the entire compound transaction.

A fourth committing step 248 includes, in response to the detecting, committing either all or none of the data pertaining to one or more component transactions from the linked list (or other suitable buffer mechanism) to a database, depending upon a predetermined atomicity setting associated with the compound transaction.

Hence, the present example embodiment facilitate enabling configuration and implementation of user-interactable elements (e.g., component transaction UI display screen sections) from multiple transactions, using the business logic from existing transactions to process the multiple transactions, but deferring any final submit or save processing until the business logic has completed successfully before committing to the database.

Note that certain changes made to a given compound transaction are not necessarily propagated to affect constituent component transactions. Each branch and/or leaf of a transaction hierarchy can be configured to optionally exhibit atomicity.

Also note that conventional buffering techniques for buffering data base request messages typically do not store preliminary results of transaction processing and validation, and typically do not enable edits made to the buffer before the buffer is submitted to a database system for implementation of data commits, as may occur in certain implementations of embodiments discussed herein.

Figure 8:
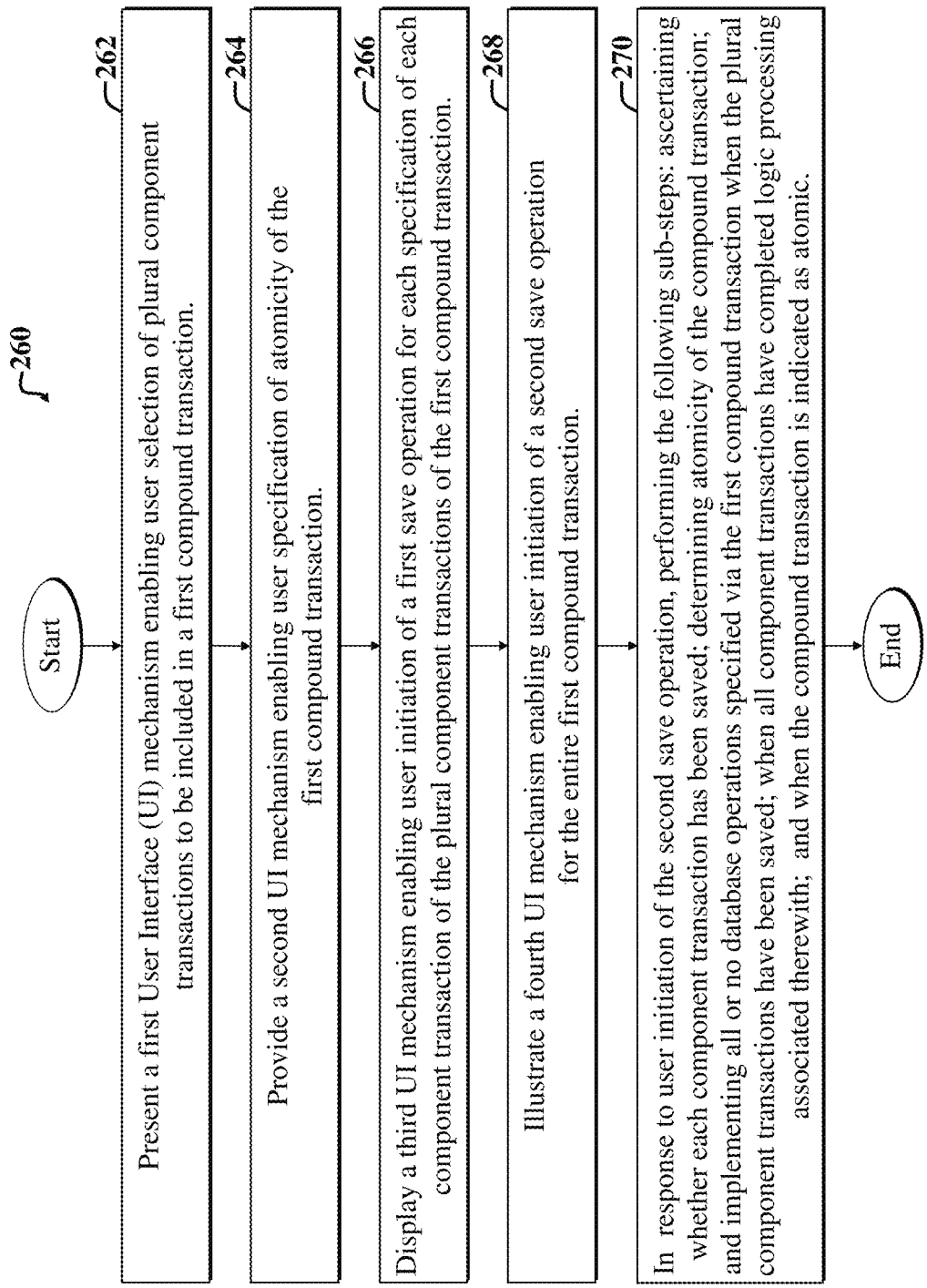
FIG. 8 is a flow diagram of a fourth example method suitable for use with the embodiments of FIGS. 1-7 from an overall system perspective.

FIG. 8 is a flow diagram of a fourth example method 260 suitable for use with the embodiments of FIGS. 1-7 from an overall system perspective. The fourth example method 260 facilitates construction and operation of a compound transaction.

The fourth example method 260 includes a first step 262, which involves presenting a first UI mechanism enabling user selection of plural component transactions to be included in a first compound transaction.

A second step 264 includes providing a second UI mechanism enabling user specification of atomicity of the first compound transaction.

A third step 266 includes displaying a third UI mechanism enabling user initiation of a first save operation for each specification of each component transaction of the plural component transactions of the first compound transaction.

A fourth step 268 includes illustrating a fourth UI mechanism enabling user initiation of a second save operation for the entire first compound transaction.

A fifth step 270 includes, in response to user initiation of the second save operation, performing the following: ascertaining whether each component transaction has been saved; determining atomicity of the compound transaction; and if the compound transaction is indicated as atomic, then after each first save operation has completed, implementing all database operations specified via the first compound transaction when all component transactions have completed logic processing associated therewith.

The fourth example method 260 may be altered, without departing from the scope of the present teachings. For example, the fourth example method 260 may further include presenting a fifth UI mechanism enabling user selection of the first compound transaction as a component transaction of a second compound transaction, thereby enabling nesting of groups of transactions that results in a hierarchy of transactions, whereby each child transaction of a parent transaction in which the child transaction is nested represents a child component transaction of the parent transaction.

The child component transaction includes a custom transaction, e.g., a transaction that has been modified or changed relative to that which was initially supplied by a vendor. The one or more customizations made to the parent transaction of the child component transaction may include one or more customizations that do not affect operation of business logic processing associated with one or more steps of the child component transaction.

The fourth example method 260 may further include presenting a sixth UI mechanism enabling user specification of one or more atomicity relationships between component transactions of a sub-group of component transactions of the compound transaction. Then, when two or more component transactions of the sub-group of component transactions are specified as atomic, only implementing database operations associated with the component transactions when all of the two or more component transactions have completed business logic processing.

Operations of the first compound transaction may include performing business logic processing associated with each component transaction of the first compound transaction.

The fourth example method 260 may further include storing results of business logic processing in advance of performing database operations associated with the business logic processing for each component transaction.

The fourth example method 260 may further include specifying the results of the business logic processing for the first compound transaction as a linked list of steps; and implementing one or more database operations indicated by the linked list of steps after business logic processing completes. The one or more database operations may include one or more database commit operations associated with saving data in accordance with the results of business logic processing.

Although the description has been described with respect to particular embodiments thereof, these particular embodiments are merely illustrative, and not restrictive. For example, while various embodiments are discussed herein with respect to business-related transactions and associated UI display screen sections or components, embodiments are not limited thereto. Applications other than enterprise applications, and transactions other than business-related transactions, may be implemented in accordance with embodiments discussed herein, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for facilitating construction and operation of a compound transaction, the method comprising:
   presenting a first User Interface (UI) mechanism enabling user selection of plural component transactions to be included in a first compound transaction;
   providing a second UI mechanism enabling user specification of atomicity of the first compound transaction;
   displaying a third UI mechanism enabling user initiation of a first save operation for each specification of each component transaction of the plural component transactions of the first compound transaction;
   providing a fourth UI mechanism enabling user initiation of a second save operation for the entire first compound transaction; and
   in response to user initiation of the second save operation performing the following:
      ascertaining whether each first save operation has completed for each of the plural component transactions, and if so, then
      (a) determining atomicity of the compound transaction; and
      (b) if the compound transaction is indicated as atomic, then after each first save operation has completed, implementing all or no database operations specified via the first compound transaction when all component transactions have completed logic processing associated therewith.

2. The method of claim 1, further including presenting a fifth UI mechanism enabling user selection of the first compound transaction as a component transaction of a second compound transaction, thereby enabling nesting of groups of transactions that results in a hierarchy of transactions, whereby each child transaction of a parent transaction in which the child transaction is nested represents a child component transaction of the parent transaction.

3. The method of claim 2, wherein the child component transaction includes a custom transaction.

4. The method of claim 3, wherein one or more customizations made to the parent transaction of the child component transaction include one or more customizations that do not affect operation of business logic processing associated with one or more steps of the child component transaction.

5. The method of claim 1, further including presenting a sixth UI mechanism enabling user specification of one or more atomicity relationships between component transactions of a sub-group of component transactions of the compound transaction.

6. The method of claim 5, further including, when two or more component transactions of the sub-group of component transactions are specified as atomic, only implementing database operations associated with the component transactions when all of the two or more component transactions have completed business logic processing.

7. The method of claim 5, wherein operations of the first compound transaction include performing business logic processing associated with each component transaction of the first compound transaction.

8. The method of claim 1, further including storing results of business logic processing in advance of performing database operations associated with the business logic processing for each component transaction.

9. The method of claim 8, further including:
specifying the results of the business logic processing for the first compound transaction as a linked list of steps; and
implementing one or more database operations indicated by the linked list of steps after business logic processing completes.

10. The method of claim 9, wherein the one or more database operations include one or more database commit operations associated with saving data in accordance with the results of business logic processing.

11. A non-transitory processor-readable storage device including instructions executable by a digital processor, the processor-readable storage device including one or more instructions for:
presenting a first User Interface (UI) mechanism enabling user selection of plural component transactions to be included in a first compound transaction;
providing a second UI mechanism enabling user specification of atomicity of the first compound transaction; and
displaying a third UI mechanism enabling user initiation of a first save operation for each specification of each component transaction of the plural component transactions of the first compound transaction;
providing a fourth UI mechanism enabling user initiation of a second save operation for the entire first compound transaction; and
in response to user initiation of the second save operation performing the following:
ascertaining whether each first save operation has completed for each of the plural component transactions, and if so, then
(a) determining atomicity of the compound transaction; and
(b) if the compound transaction is indicated as atomic, then after each first save operation has completed, implementing all or no database operations specified via the first compound transaction when all component transactions have completed logic processing associated therewith.

12. The non-transitory processor-readable storage device of claim 11, further including presenting a fifth UI mechanism enabling user selection of the first compound transaction as a component transaction of a second compound transaction, thereby enabling nesting of groups of transactions that results in a hierarchy of transactions, whereby each child transaction of a parent transaction in which the child transaction is nested represents a child component transaction of the parent transaction.

13. The non-transitory processor-readable storage device of claim 12, wherein the child component transaction includes a custom transaction.

14. The non-transitory processor-readable storage device of claim 13, wherein one or more customizations made to the parent transaction of the child component transaction include one or more customizations that do not affect operation of business logic processing associated with one or more steps of the child component transaction.

15. The non-transitory processor-readable storage device of claim 11, further including presenting a sixth UI mechanism enabling user specification of one or more atomicity relationships between component transactions of a sub-group of component transactions of the compound transaction.

16. The non-transitory processor-readable storage device of claim 15, further including, when two or more component transactions of the sub-group of component transactions are specified as atomic, only implementing database operations associated with the component transactions when all of the two or more component transactions have completed business logic processing.

17. The non-transitory processor-readable storage device of claim 15, wherein operations of the first compound transaction include performing business logic processing associated with each component transaction of the first compound transaction.

18. The non-transitory processor-readable storage device of claim 11, further including storing results of business logic processing in advance of performing database operations associated with the business logic processing for each component transaction.

19. The non-transitory processor-readable storage device of claim 18, further including:
specifying the results of the business logic processing for the first compound transaction as a linked list of steps; and
implementing one or more database operations indicated by the linked list of steps after business logic processing completes.

20. The non-transitory processor-readable storage device of claim 19, wherein the one or more database operations include one or more database commit operations associated with saving data in accordance with the results of business logic processing.

* * * * *

UNITED STATES PATENT AND TRADEMARK OFFICE
CERTIFICATE OF CORRECTION

PATENT NO. : 9,984,142 B2
APPLICATION NO. : 14/934061
DATED : May 29, 2018
INVENTOR(S) : Afzal Page 1 of 1

It is certified that error appears in the above-identified patent and that said Letters Patent is hereby corrected as shown below:

In the Specification

In Column 4, Lines 51-52, delete "may be may be" and insert -- may be --, therefor.

Signed and Sealed this
Fifth Day of February, 2019

Andrei Iancu
*Director of the United States Patent and Trademark Office*